No. 876,051. PATENTED JAN. 7, 1908.
J. E. FRANTZ.
INCUBATOR TRAY.
APPLICATION FILED AUG. 21, 1906.

WITNESSES:

Jacob E. Frantz,
INVENTOR.
By C. A. Snow & Co.
ATTORNEYS

UNITED STATES PATENT OFFICE.

JACOB E. FRANTZ, OF ROCK ISLAND, ILLINOIS.

INCUBATOR-TRAY.

No. 876,051.

Specification of Letters Patent.

Patented Jan. 7, 1908.

Application filed August 21, 1906. Serial No. 331,507.

*To all whom it may concern:*

Be it known that I, JACOB E. FRANTZ, a citizen of the United States, residing at Rock Island, in the county of Rock Island and State of Illinois, have invented a new and useful Incubator-Tray, of which the following is a specification.

This invention has relation to incubator tray and it consists in the novel construction and arrangement of parts as hereinafter fully shown and described.

The object of the invention is to equip a tray with a means for easily and readily turning all of the eggs contained within the tray simultaneously. Said means consisting primarily of a pair of rollers journaled at opposite ends of the tray, one at a higher altitude than the other. The shaft of one of the said rollers is provided with a crank handle. An endless apron passses around the said rollers and by reason of the difference in altitude of the said rollers the said apron is inclined at an angle to the horizon. Consequently, when the eggs are deposited upon the upper surface of the apron they are maintained against each other by gravity and as the apron is moved and the eggs are turned none of the eggs may roll back and forth and consequently break by coming in contact with each other.

Figure 1:
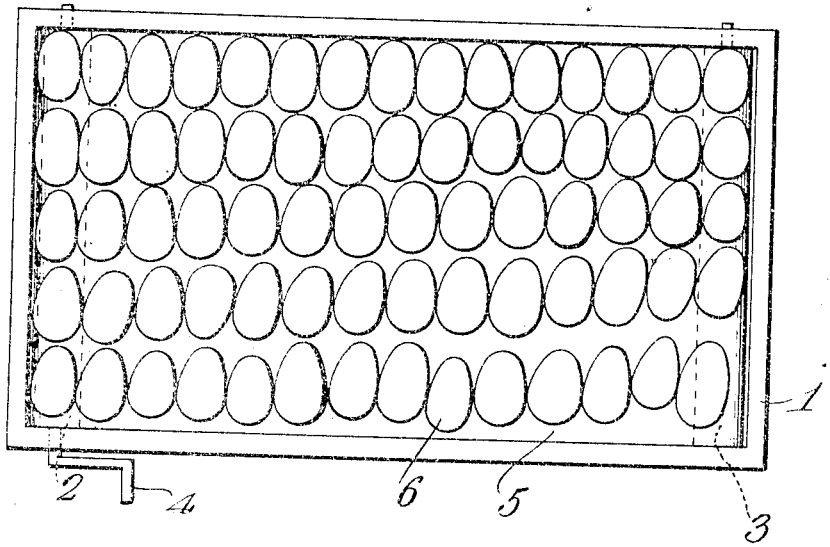
Figure 2:
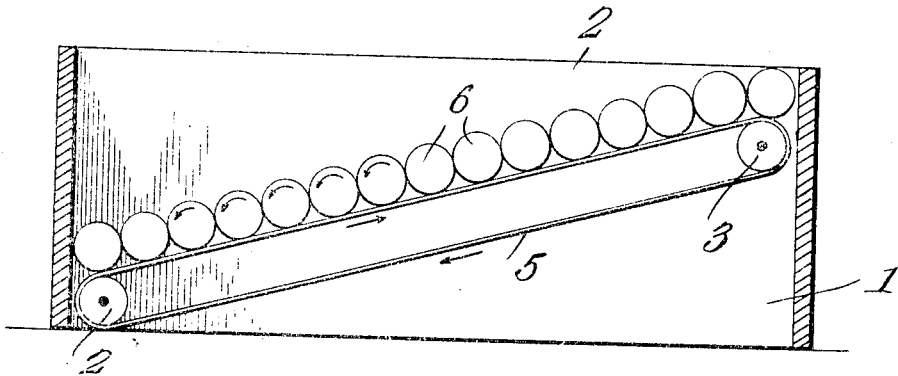

In the accompanying drawing:—Figure 1 is a top plan view of the tray. Fig. 2 is a vertical sectional view of the same.

The tray 1 is of usual formation and is provided at its opposite ends with the rollers 2 and 3. The roller 2 is journaled in the lower edge of the tray while the roller 3 is journaled in the upper portion thereof: The shaft of the roller 2 is provided with a crank handle 4 which is located upon the outer sides of the tray 1. The endless apron 5 passes around the rollers 2 and 3. The eggs 6 are placed upon the upper surface of the apron 5.

When it is desired to turn the eggs simultaneously the operator grasps a handle 4 and turns the roller 3 and consequently the apron 5 moves longitudinally around the rollers 2 and 3 and the eggs 6 are turned. By reason of the fact that the said eggs are maintained in inclined columns none of the eggs can jostle or turn back and forth as they are moved and become cracked or injured. This advantage is due to placing the apron at an incline. I am aware that horizontal aprons have been employed for turning eggs but the disadvantage of such aprons is that the eggs being supported on horizontal levels become separated and hence when turned may jostle back and forth and become injured or cracked. With my arrangement this disadvantage is entirely done away with.

As the tray 1 is devoid of egg-dividing partitions the eggs 6 are in actual contact with each other and are supported upon the apron 5 only, which in turn is supported by the rollers 2 and 3 only. Thus, the construction of the tray is simplified and as each individual egg bears with its entire weight upon the apron sufficient friction is afforded between each egg and the apron to cause the egg to rotate when the apron moves longitudinally. This movement occurs even though the eggs differ in diameter which is usually the case. My device therefore differs in construction and principle over devices in which the interior area between the sides of the tray and above the apron is obstructed by egg-dividing partitions, for in such devices transverse apron supports must be arranged under the upper portion of the apron and midway between the egg-dividing partitions, otherwise eggs of small diameter would fall through the space between the egg-dividing partitions and if a sufficient number should do so the weight thereof would cause the upper portion of the apron to sag so that the eggs of greater diameter would not touch the same but would be held in relatively elevated positions by the egg-dividing partitions, therefore, by dispensing with the egg-dividing partitions and the transverse supports above referred to I not only simplify the construction of the tray but assure the rotation of every egg when the apron is moved. The advantage gained by attaching the operating handle 4 to the roller 2 is that when the said roller 2 is turned so as to move the apron 5 in the direction of the arrows shown in Fig. 2 the pull or stress occurs first upon the under portion of said apron and the upper portion thereof is pushed. Thus should there be sag in the upper portion of the apron (such sag would usually be present owing to the weight of the eggs) it would not be suddenly taken up so as to move the eggs violently in a vertical direction. If the handle 4 were attached to the roller 3 the eggs would be moved violently in a vertical direction when the said roller is turned, due to the taking up of the slack in the upper portion of the apron. Consequently, the contents of the eggs, especially those near the middle of the apron would be subjected to an undesirable and injurious vertical movement.

Having described my invention what I claim as new and desire to secure by Letters Patent is:—

A device as described comprising a tray, rollers journalled therein at different altitudes, an endless inclined apron supported wholly by said rollers and adapted to move around the same, the entire interior area between the sides of the tray and above the apron being unobstructed.

In testimony that I claim the foregoing as my own, I have hereto affixed my signature in the presence of two witnesses.

JACOB E. FRANTZ.

Witnesses:
  H. B. SIMMON,
  J. H. SLAUGHTER.